United States Patent
Rockenbach

(10) Patent No.: US 6,959,949 B2
(45) Date of Patent: Nov. 1, 2005

(54) DEVICE FOR SECURING A DOOR LEAF AGAINST UNINTENTIONAL DEFLECTION

(75) Inventor: Manfred Rockenbach, Frechen (DE)

(73) Assignee: Dorma GmbH + Co. KG, Ennepetal (DE)

( * ) Notice: Subject to any disclaimer, the term of this patent is extended or adjusted under 35 U.S.C. 154(b) by 0 days.

(21) Appl. No.: 10/467,907

(22) PCT Filed: Feb. 9, 2001

(86) PCT No.: PCT/EP01/01417

§ 371 (c)(1),
(2), (4) Date: Dec. 1, 2003

(87) PCT Pub. No.: WO02/064924

PCT Pub. Date: Aug. 22, 2002

(65) Prior Publication Data

US 2004/0066047 A1 Apr. 8, 2004

(51) Int. Cl.⁷ .............................................. E05B 65/10
(52) U.S. Cl. ......................... 292/93; 292/92; 292/144; 292/DIG. 65; 109/6; 109/7; 109/8; 49/42; 49/43
(58) Field of Search .......................... 292/93, 92, 144, 292/DIG. 65; 109/6, 7, 8; 49/42, 43

(56) References Cited

U.S. PATENT DOCUMENTS

| | | | | |
|---|---|---|---|---|
| 954,547 A | * | 4/1910 | Spivey | 109/73 |
| 1,558,193 A | * | 10/1925 | Lucking | 292/201 |
| 1,949,310 A | * | 2/1934 | Kelly | 109/6 |
| 1,958,321 A | * | 5/1934 | Statler | 49/42 |
| 2,123,107 A | * | 7/1938 | Hodos | 292/37 |
| 2,523,980 A | | 9/1950 | Whiteford | |
| 3,285,209 A | * | 11/1966 | Pace | 109/8 |
| 4,341,165 A | * | 7/1982 | Calandritti et al. | 109/8 |
| 4,385,469 A | * | 5/1983 | Scheuerpflug et al. | 49/41 |
| 4,475,308 A | * | 10/1984 | Heise et al. | 49/42 |
| 4,530,183 A | * | 7/1985 | Heise et al. | 49/42 |
| 4,534,131 A | * | 8/1985 | Blackston et al. | 49/42 |
| 4,562,665 A | | 1/1986 | Blackston | |
| 4,565,030 A | * | 1/1986 | LaSance | 49/44 |
| 4,784,415 A | * | 11/1988 | Malaval | 292/144 |
| 4,796,542 A | * | 1/1989 | Lee | 109/8 |
| 4,970,825 A | | 11/1990 | Knarvik | |
| 5,076,013 A | * | 12/1991 | Gallenschutz et al. | 49/42 |
| 5,542,211 A | * | 8/1996 | Colombo | 49/42 |
| 6,035,675 A | * | 3/2000 | Zimmer et al. | 70/186 |
| 6,050,116 A | * | 4/2000 | Cole | 70/256 |
| 6,053,546 A | * | 4/2000 | Frolov | 292/251.5 |
| 6,135,515 A | | 10/2000 | Roth et al. | |
| 6,499,325 B1 | * | 12/2002 | Hurskainen | 70/276 |

FOREIGN PATENT DOCUMENTS

DE    299 05 967 U1    8/1999

* cited by examiner

Primary Examiner—Daniel P. Stodola
Assistant Examiner—Carlos Lugo
(74) Attorney, Agent, or Firm—Cohen, Pontani, Lieberman & Pavane

(57) ABSTRACT

A driven part can be pivotably mounted to the door frame so that, in a starting position, it engages a driving part fixed to the leaf frame in order to fix the position of the door leaf with respect to the door frame. An electromagnetic brake generates a moment to retain the driven part in the starting position when electrical current is supplied, and allows the driven part to pivot from the starting position when electrical current is not supplied. The driven part is held in the starting position when the driven part returns to the starting position and no moment is generated by the electromagnetic brake.

8 Claims, 4 Drawing Sheets

DEVICE FOR SECURING A DOOR LEAF AGAINST UNINTENTIONAL DEFLECTION

PRIORITY CLAIM

This is a U.S. national stage of application No. PCT/EP01/01417, filed on Feb. 9, 2001. Priority is claimed on that application.

BACKGROUND OF THE INVENTION

1. Field of the Invention

The invention pertains to a device for preventing the door leaves of a door system with at least one leaf used in an escape and rescue route from being swung unintentionally out of position.

2. Description of the Related Art

It is known that revolving doors, for example, have leaves which rotate around a central axis. The leaves extend between the central, pillar-like drive component and the boundary walls of the revolving door, which are designed in the form of segments of a cylinder. The leaves are supported on the central drive component in such a way that they can pivot, so that, after the revolving door has been stopped, a retaining force can be overcome and the leaves swung out of their normal, radially oriented operating position, in which they are perpendicular to the boundary walls as the revolving door revolves, into an open position, which allows free passage.

As a result, a rescue and escape route is opened, which makes it possible for people to pass through the revolving door without hindrance.

A design of this type also means that the revolving door can be stopped from revolving and the leaves opened in situations where this would be desirable, such as especially during the summer.

A comparable situation exists in the case of sliding door systems. A defined retaining force must again be overcome so that the sliding doors can be swung out of their normal position in which they are in a plane parallel to the stationary sidewalls into an open position which allows free passage in an emergency.

It is difficult to support doors of this type in such a way that they can be intentionally released and swung out of position because, first, the leaves of a revolving door must be held securely in their normal position, in which they can form an "X" in cross section, for example, when the door is revolving. Second, after the door has been stopped, it must be possible to swing the leaves aside by hand either when desired or after overcoming a predetermined retaining force and thus to move them into the position in which they allow free passage and thus create a rescue and escape route. Because the dimensions of such door systems and thus also of the leaves themselves are relatively large, the forces acting on the door during normal operation must also be taken into account.

As experience has shown, the retaining forces required for the leaves to withstand wind pressure are much higher than the forces which can be reasonably expected to be overcome when the leaves are to be opened in a panic situation. Because the positions of the door leaves are usually scanned for control purposes, situations in which the leaves have been unintentionally swung out of their normal positions can cause problems with the normal operation of the door and prevent the door from being moved at all. The door leaves must therefore always be held in their normal position in spite of the forces which may be acting on them, but it must also be possible to swing them out of the way in a panic situation.

For this purpose, a so-called "storm lock" is known from DE 40 36 881 C2, in which a stop device, which rotates around the central axis of the revolving door, can be brought into engagement with a partially elastic, pivotable retaining device to prevent the door leaves from swinging out of position until a force is exerted which is strong enough to swing at least part of the retaining device away from the stop device, thus making it possible for the door leaves to swing. The amount of this force, which acts on the retaining device, is predetermined by the stop device.

The retaining device has stop points, designed as cams. A roller, which is supported on a spring-loaded, four-bar linkage with adjustable elastic force, cooperates with the retaining device. The four-bar linkage can also be locked in position by means of an electromagnet.

The effort required to construct a device of this type is considerable; it is complicated to install; and it is difficult to adjust the elastic forces properly. In particular, however, because of the spring-loaded pretension of the four-bar linkage, the blocking action can be overridden by shock-like forces even when the electromagnets are active.

Latching devices for holding the leaves of revolving doors in position are also known. In this type of device, each leaf has its own drive, which pushes the leaf against a stop, which holds the leaf in place. The stop can be actuated by an electromagnetic retaining magnet; compare DE 44 42 191 A1.

This type of design is also very complicated to build and to install, because a drive, designed as a door closer, for example, must be provided for each door leaf, and each of these drives must develop enough torque to hold the door leaf in question against the controlled stop. To improve the retaining force, retaining magnets can also be provided.

In addition, the action of these types of door closers is dependent on the direction in which they operate, which means that an additional drive must be provided for each door leaf to return the leaf to its original position. This represents an additional complication in the construction of these types of revolving doors and also leads to additional expense.

A damping and retaining device with an electrical retaining magnet and an eddy-current brake, furthermore, is known from DE 90 00 881 U1. This device can be used in the drives of doors and gates.

Finally, latch catches which can be actuated by linear motors and which can serve to secure the leaves of a revolving door are also known. Compare EP 0 340 771.

As a result of their electromechanical complexity, however, it has been impossible to introduce these devices into widespread use.

SUMMARY OF THE INVENTION

The invention is based on the task of simplifying the known devices for preventing the leaves of a door system from being swung out of position unintentionally, especially by wind pressure, so that the operational reliability of these devices can be improved and their service lives prolonged.

According to the invention, each leaf of the door has its own rotational direction-independent locking mechanism to serve as a controllable securing means which can be locked by magnetic brake. The driving part of the mechanism is mounted permanently to the leaf frame, whereas the driven part is mounted permanently but rotatably to the door frame, where the driving part can be returned automatically to the starting position.

The design of the means used to hold the leaves in place in their normal operating position by means of a locking mechanism consisting of a pin assigned to the leaf and a fork arm, which is permanently but rotatably attached to the frame and which, in the normal or working position, surrounds the retaining pin but releases the retaining pin after being pivoted outward by preferably ±30°, and a magnetic brake assigned to the fork arm to generate the required retaining moment in the normal or working position of the fork arm, is extremely effective and reliable, because the leaf retaining pin assigned to the leaf is a part of the locking mechanism and is thus held positively in place without the need for springs.

In addition, the retaining force produced by the magnetic brake can be adjusted relatively easily to suit the operating conditions in question.

Because the magnetic brake is mounted on a bolt between the fork arm and the fork arm bracket together with the means for rotatably supporting the bolt on the roof structure of the door system, a compactly designed and very lightweight device, which occupies little space, is obtained for securing the leaves of the door. This is a significant advantage not only with respect to cost but also with respect to the installation, operation, and maintenance of these types of revolving doors.

The position of the leaves at any moment can be transmitted by way of a switch, which scans the switching position of the latching elements, to a circuit arrangement which controls the operation of the door system.

Another advantage is that, when the magnetic brake is released, i.e., when it is not receiving any current, the leaf in question can be swung aside easily and without a great deal of force. As the leaf is being swung back into the normal position, the retaining pin engages easily and reliably with the fork arm and carries the fork arm and thus also the fork bracket along with it into the normal position. The various forces in question, namely, the force required to withstand wind pressure and the force which must be overcome to open the door wing in a panic situation, can therefore always be adjusted safely, reliably, and reproducibly.

In a preferred embodiment, the leaf is swung back into its normal position automatically. Suitable for this purpose are in particular electrical, mechanical, pneumatic, or hydraulic stored-energy devices, which can be charged during the swinging movement. Drive means which can be actuated separately are also a conceivable alternative.

DETAILED DESCRIPTION OF THE PRESENTLY PREFERRED EMBODIMENTS

Figure 1:
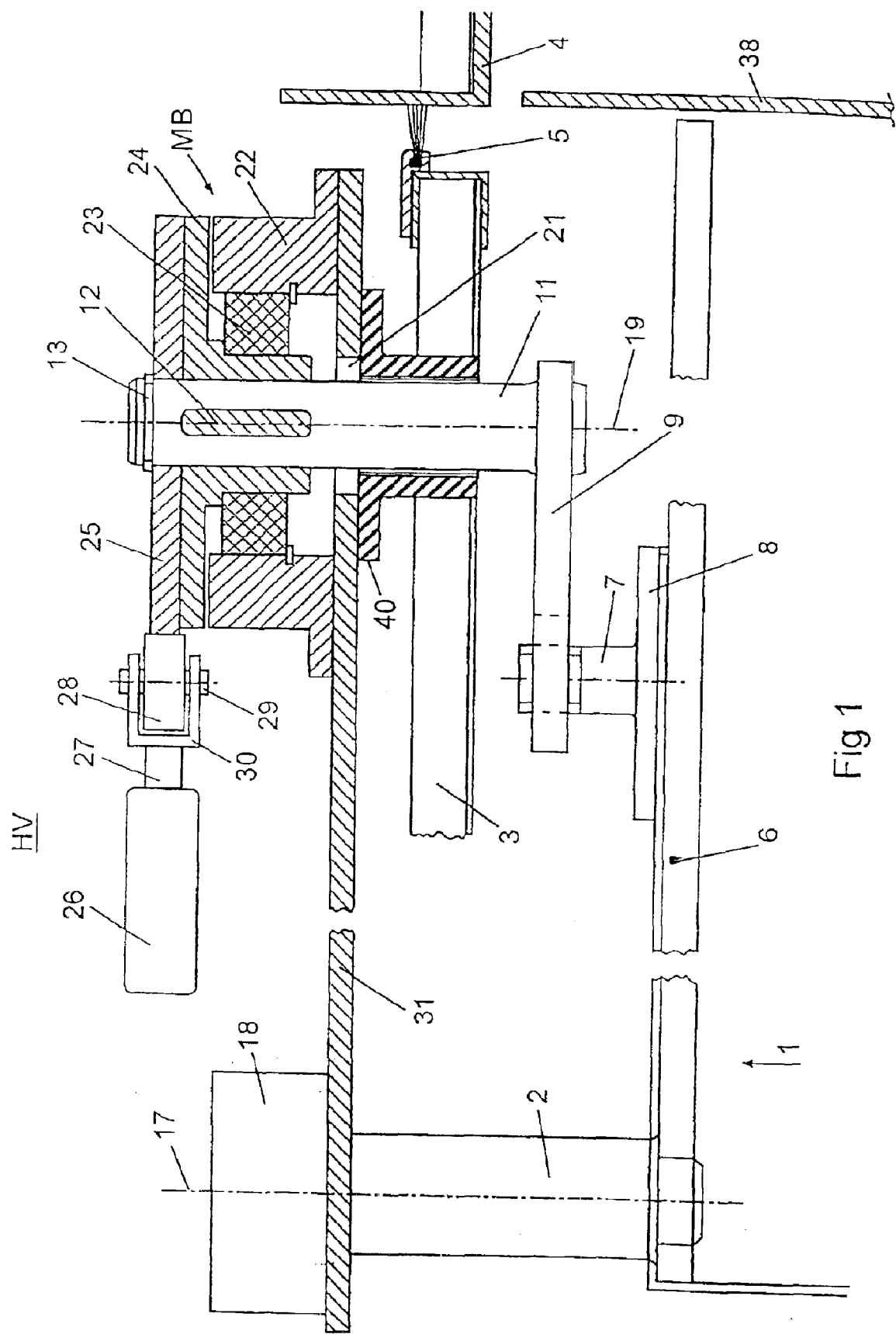
FIG. 1 shows a cross section through a retaining device according to the invention arranged opposite the upper edge of the frame of a leaf of a revolving door.
Figure 4:
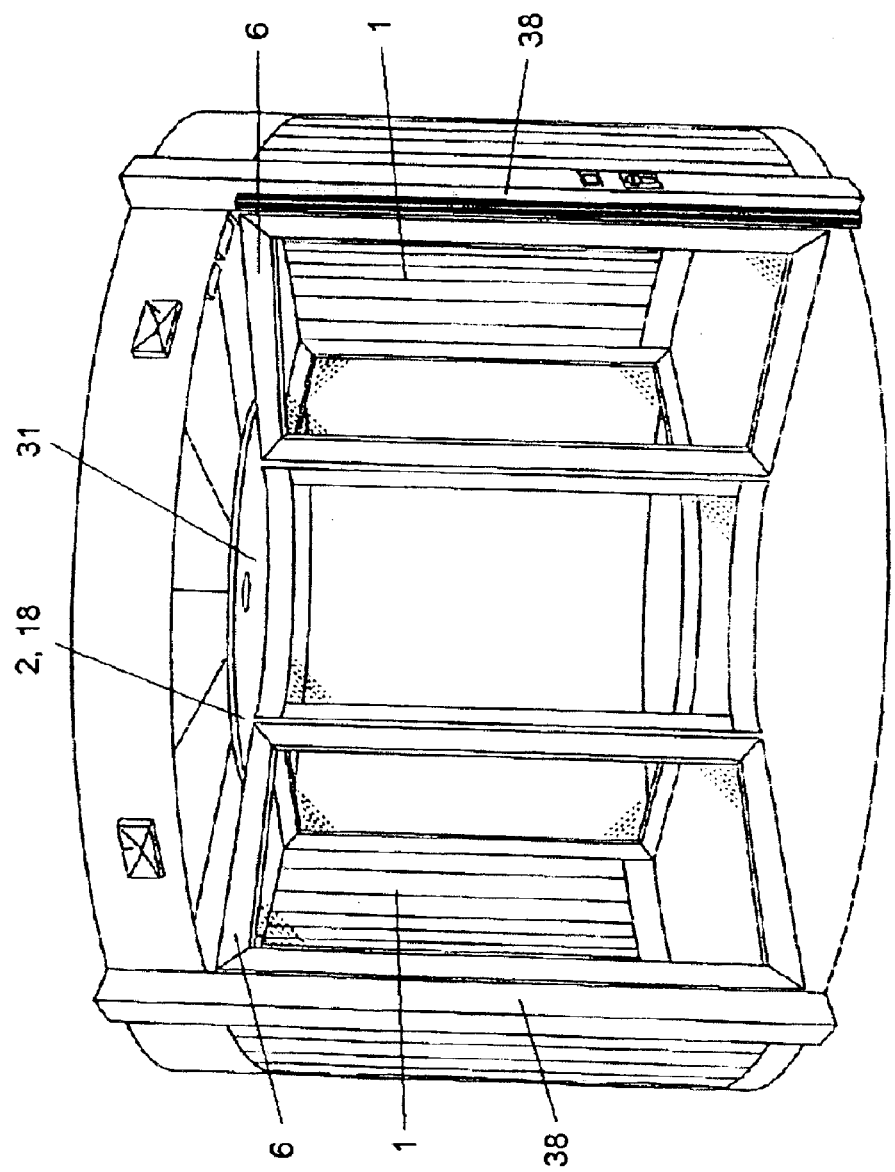
FIG. 4 shows a revolving door of the type on which the apparatus is used.

A retaining device, designated "HV" overall in FIG. 1, is provided for each leaf 1 of a multi-leaf revolving door, shown in FIG. 4, which door is installed within the boundary walls 38, the retaining device being located opposite the upper area of the frame 6 of the leaf. Each leaf 1 is supported in such a way by part of a leaf hanger 2, which forms part of a leaf support 18, that the leaf can pivot around an axis 17. The leaf supports 18 are attached to the roof structure 31, which revolves along with the door and which is concealed by a ceiling 3, which extends between the boundary walls 4, which form a cylindrical jacket.

A brush type seal 5 is provided all the way around between the ceiling 3 and the boundary walls 4.

Each leaf 1 has its own retaining bolt 7, which is permanently connected by a flange 8 to the upper edge of the leaf frame 6. As FIG. 3 in particular shows, a fork arm 9 works together with each retaining bolt 7. This arm is rotatably attached to one end of a bolt 11, which projects through a hole 21 in the roof structure. The bolt 11 passing through the ceiling 3 is rotatably supported in a flange bearing 40, which is attached to the roof structure 31; at its other end, the bolt rotatably supports a fork bracket 25, attached to the bolt by a locking device 13, this bracket being provided at its other end with latching surfaces 42–44; see also FIG. 2.

A magnetic brake, designated "MB" overall, is also assigned to the bolt 11; this brake is installed between the fork bracket 25 and the roof structure 31. The magnetic brake MB comprises a brake flange 24, permanently connected to the bolt 11 by a fitted key 12, a fork brake 22, permanently connected to the roof structure 31, and a winding 23; see FIG. 1.

Figure 2:
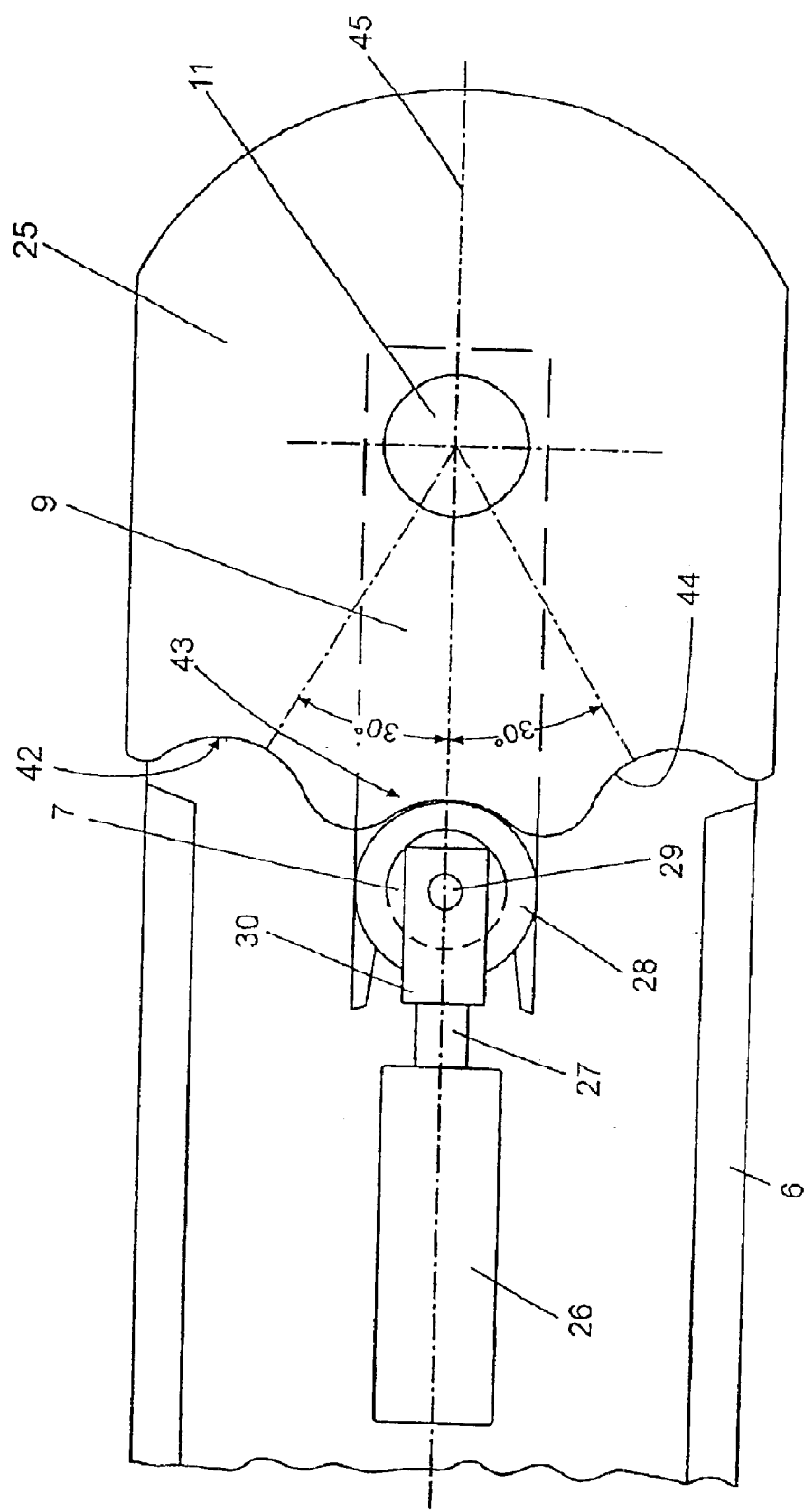
FIG. 2 shows a plan view of the retaining device according to FIG. 1 in the normal position.
Figure 3:
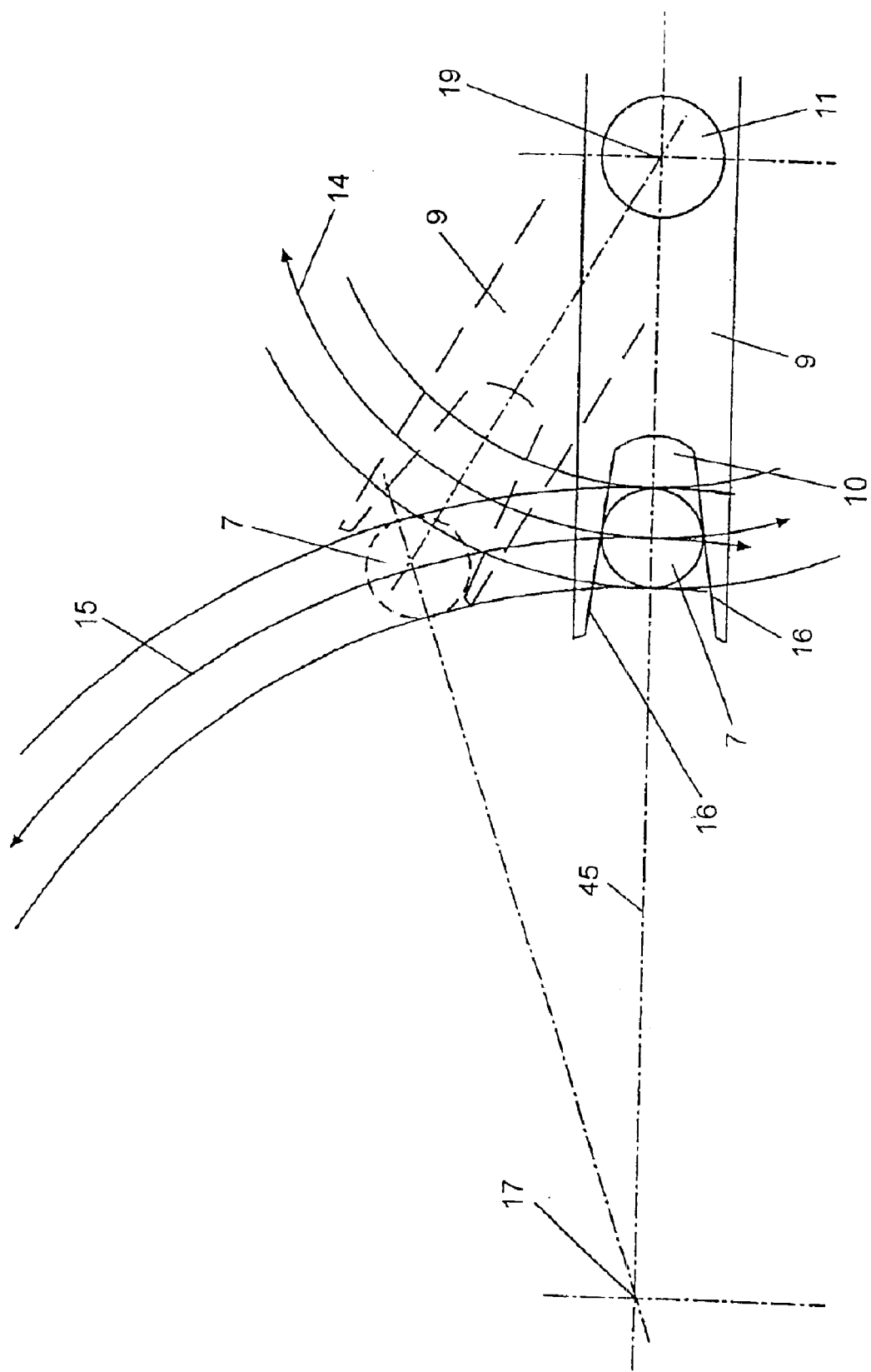
FIG. 3 shows a functional diagram of the retaining device according to FIG. 1.

On the end facing away from the bolt 11, the fork bracket 25, as FIG. 2 shows, has three semicircular latching surfaces 42, 43, 44, offset from each other by 30° with respect to the center of rotation of the fork arm; these latching surfaces work together with a roller 28, which is elastically supported in the direction transverse to its axis of rotation, in a manner to be described in greater detail below.

The roller 28 is rotatably supported by a bolt 29 in a fork 30, which can act by way of a plunger 27, spring-loaded in the axial direction, on a switch 26.

The fork arm 9 and the fork bracket 25 are therefore rigidly connected to the bolt 11, which passes through the hole 21 and is rotatably supported in the flange bearing 40 of the roof structure 31, in such a way that they are both aligned with a longitudinal axis 45, as FIG. 2 shows.

The longitudinal axis 45 is simultaneously the centerline of the spring-loaded roller 28, so that, in the position shown in FIG. 2, the centerline of the spring-loaded roller 28 and the longitudinal axis 45 are in alignment with each other. The fork side pieces 16 enclose the retaining bolt 7—see also FIGS. 1 and 3—and, as long as the fork bracket 25 remains in the position shown, they hold the leaf 1 in alignment with the longitudinal axis 45 indicated in FIG. 3, which corresponds to the normal operating position of the revolving door. To maintain this position, the required retaining moment is generated by the magnetic brake MB (see FIG. 1) as long as the winding 23 is excited, with the result that relative movement between the brake flange 24 of the fork bracket 25 and the fork brake 22 is prevented. Thus the fork arm 9 also remains in alignment with the longitudinal axis 45 and holds the leaf 1 of the revolving door in place by way of the retaining bolt 7, which is attached to the leaf frame. The force exerted by the fork arm 9, i.e., the force which prevents the leaf 1 from being moved out of its normal position by the effect of wind, for example, can be determined by adjusting the retaining force of the magnetic brake MB.

In an emergency or in a dangerous situation, this retaining force can be released by turning off the magnetic brake MB, by the exertion of force on the leaf 1 so that the leaf 1 can be swung out of its normal position in one direction or the other to create an escape route. As a result of the movement of the leaf 1 in the one pivoting direction 15 or the other around the retaining bolt 7, the fork arm 9 is moved in the one pivoting direction 14 or the other according to FIG. 3, and the spring-loaded roller 28 is moved by the latching surface 42 or 44 of the fork bracket 25 in the direction parallel to the longitudinal axis 45. This movement serves to actuate the switch 26, the switch positions of which, defined by the latching surfaces 42–44, are scanned by the control circuit of the revolving door (not shown) and can thus produce the desired result.

In addition, the latching surfaces 42 and 44 ensure the reliable latching of the fork arm 9 and the retaining bolt 7 when the leaf 1 travels back from the completely outward-swung emergency and danger position into its normal position in alignment with the longitudinal axis 45.

Of course, the locking mechanism described above can also be designed in a manner which differs from the exemplary embodiment; the only crucial point is that its movements must be interrupted by a controllable magnetic brake MB.

The present description is based on a revolving door, but the invention can also be applied to the horizontally sliding wings of a sliding door with or without side parts.

What is claimed is:

1. Apparatus for electromagnetically preventing leaves of a multi-leaf revolving door from unintentionally swinging out of a normal operating position, each said leaf being fixed in a leaf frame which is pivotably mounted with respect to a door frame of the revolving door, said apparatus comprising a rotational direction independent locking mechanism for each said door leaf, each said locking mechanism comprising:

a driving part which can be fixed to a respective said leaf frame, said driving part comprising a retaining pin upstanding from said leaf frame, a driven part which can be pivotably mounted to the door frame so that, in a starting position of said driven part, said driven part engages said driving part to fix the position of said door leaf frame in the normal operating position with respect to said door frame, said driven part comprising a fork arm which can be pivoted to engage and disengage said retaining pin, an electromagnetic brake which, when electrical current is supplied, generates a moment to retain said driven part in said starting position, and when electrical current is not supplied, allows said driven part to pivot from said starting position, said electromagnetic brake comprising a brake flange, a shaft rotatably mounted in said door frame, said fork arm and said brake flange being fixed to said shaft, a fork bracket fixed to said shaft for pivoting synchronously with said fork arm, and a switching mechanism which cooperates with the fork bracket to indicate the position of the leaf frame with respect to the door frame.

2. A locking mechanism as in claim 1 wherein said door frame comprises a roof structure having a hole, said locking mechanism further comprising a bearing fixed to said roof structure for supporting said shaft in said hole, said electromagnetic brake being mounted on top of said roof structure.

3. A locking mechanism as in claim 1 wherein said fork bracket has cam surfaces, said switching mechanism comprising a cam follower and a switch which is activated by said cam follower as said cam follower follows said cam surfaces.

4. A locking mechanism as in claim 3 wherein said fork bracket has three said cam surfaces including a central cam surface which is aligned between said shaft and said cam follower when said fork arm is in said starting position.

5. A locking mechanism as in claim 1 wherein said fork arm comprises a free end having a fork opening which engages said retaining pin when said fork arm is in said starting position.

6. A locking mechanism as in claim 1 wherein said electromagnetic brake can generate a moment which is continuously variable.

7. A multi-leaf revolving door apparatus comprising:

a pair of cylindrical boundary wall segments;

a door frame rotatable between said wall segments;

a plurality of door leaves, each said leaf being fixed in a leaf frame which is pivotably mounted with respect to said door frame;

a driving part fixed to each said leaf frame, each said driving part comprising a retaining pin upstanding from said leaf frame, a driven part pivotably mounted to the door frame so that, in a starting position of said driven part, said driven part engages a respective said driving part to fix the position of said door leaf frame with respect to said door frame, each said driven part comprising a fork arm which can be pivoted to engage and disengage said retaining pin, an electromagnetic brake which, when electrical current is supplied, generates a moment to retain said driven part in said starting position, and when electrical current is not supplied, allow said driven part to pivot from said starting position, each said electromagnetic brake comprising a brake flange, a plurality of shafts rotatably mounted in said door frame, said fork arm and said brake flange being fixed to said shaft, a fork bracket fixed to said shaft for pivoting synchronously with said fork arm, and a switching mechanism which cooperates with the fork bracket to indicate the position of the leaf frame with respect to the door frame.

8. Apparatus as in claim 7 wherein said door frame comprises a roof structure having a hole, said locking mechanism further comprising a bearing fixed to said roof structure for supporting said shaft in said hole, said electromagnetic brake being mounted on top of said roof structure.

* * * * *